(12) United States Patent
Noble et al.

(10) Patent No.: US 8,579,510 B2
(45) Date of Patent: Nov. 12, 2013

(54) ROTATABLE BAR PIN BUSHING ASSEMBLY

(75) Inventors: Shawn D. Noble, Naperville, IL (US); Hormoz Kerendian, Buffalo Grove, IL (US); Ashley T. Dudding, Yorkville, IL (US); Louis F. Mattia, Fremont, IN (US); Charles A. Parrish, Naperville, IL (US)

(73) Assignee: Hendrickson USA, L.L.C., Itasca, IL (US)

(*) Notice: Subject to any disclaimer, the term of this patent is extended or adjusted under 35 U.S.C. 154(b) by 623 days.

(21) Appl. No.: 12/723,414

(22) Filed: Mar. 12, 2010

(65) Prior Publication Data
US 2011/0222803 A1    Sep. 15, 2011

(51) Int. Cl.
*F16C 35/02* (2006.01)
*F16C 11/00* (2006.01)
*F16F 1/48* (2006.01)

(52) U.S. Cl.
USPC ........... 384/428; 384/129; 384/154; 384/222; 403/220; 267/293

(58) Field of Classification Search
USPC ........... 384/91, 129, 195–196, 215, 425, 428, 384/154, 220–223; 403/122, 131, 134, 220, 403/221, 227, 445, 132, 135, 137, 141, 403/291; 267/140.12, 141.5, 280, 292–293
See application file for complete search history.

(56) References Cited

U.S. PATENT DOCUMENTS

| | | | |
|---|---|---|---|
| 4,768,760 A * | 9/1988 | Le Fol | 267/140.12 |
| 4,809,960 A * | 3/1989 | Kakimoto et al. | 267/280 |
| 5,118,087 A * | 6/1992 | Jordens et al. | 267/140.12 |
| 5,288,059 A * | 2/1994 | Gautheron et al. | 267/292 |
| 5,503,376 A * | 4/1996 | Simuttis et al. | 267/293 |
| 5,516,083 A * | 5/1996 | Sprang et al. | 267/140.12 |
| 5,846,014 A * | 12/1998 | Arthur et al. | 403/291 |
| 5,931,597 A * | 8/1999 | Urbach | 403/134 |

(Continued)

FOREIGN PATENT DOCUMENTS

| | | |
|---|---|---|
| AU | 630358 | 3/1991 |
| CA | 1327979 | 3/1994 |

(Continued)

OTHER PUBLICATIONS

Hendrickson Selection Guide, Equalizing Beam and Components, Lit No. 45745-147 Apr. 2008.

(Continued)

*Primary Examiner* — Marcus Charles
(74) *Attorney, Agent, or Firm* — McDonnell Boehnen Hulbert & Berghoff LLP (57) ABSTRACT

A rotatable bar pin bushing assembly is disclosed for connecting components in a vehicular system, such as a suspension and/or axle system. The rotatable bar pin bushing assembly includes an inner sleeve, an outer sleeve positioned around the inner sleeve, and an insert positioned between the inner and outer sleeves. The rotatable bar pin bushing assembly also includes a bar pin rotatably positioned within the inner sleeve. The bar pin has at least one end with at least one bore extending therethrough to receive a fastener. The bar pin is rotatable within the inner sleeve to allow indexing of the bar pin for registering the at least one bore of the bar pin with a connector of a different component. A method for assembling the rotatable bar pin bushing assembly is also disclosed.

14 Claims, 6 Drawing Sheets

(56) References Cited

U.S. PATENT DOCUMENTS

| | | | |
|---|---|---|---|
| 6,430,774 B1 * | 8/2002 | McLaughlin et al. | 403/220 |
| 6,726,394 B2 * | 4/2004 | Garnier et al. | 403/135 |
| 6,851,689 B2 | 2/2005 | Dudding et al. | |
| 6,854,723 B2 * | 2/2005 | Ogawa et al. | 267/293 |
| 7,165,909 B2 * | 1/2007 | Buhl et al. | 403/132 |
| 7,182,354 B2 | 2/2007 | Dudding | |
| 7,451,967 B2 * | 11/2008 | McLaughlin et al. | 267/141.2 |
| 7,513,517 B2 | 4/2009 | Barton et al. | |
| 8,262,067 B2 * | 9/2012 | Troyke | 267/140.12 |
| 2002/0048485 A1 * | 4/2002 | Garnier et al. | 403/135 |
| 2003/0020223 A1 * | 1/2003 | Kameda | 267/293 |
| 2003/0201589 A1 | 10/2003 | Adema et al. | |
| 2004/0046298 A1 * | 3/2004 | Takeshita et al. | 267/293 |
| 2006/0163788 A1 * | 7/2006 | Kiddle | 267/293 |
| 2006/0231993 A1 * | 10/2006 | Collyer et al. | 267/270 |
| 2007/0290425 A1 * | 12/2007 | Heuer et al. | 267/293 |

FOREIGN PATENT DOCUMENTS

| | | |
|---|---|---|
| EP | 0654617 A1 | 5/1995 |
| EP | 1245415 B1 | 1/2007 |
| EP | 1932692 | 6/2008 |
| GB | 869368 A | 5/1961 |
| JP | 10-184794 A * | 7/1998 |
| WO | 2009/125238 A1 | 10/2009 |
| WO | WO 2009/124120 A1 * | 10/2009 |

OTHER PUBLICATIONS

Hendrickson Publication, Basic Beam Components 340 Thru 520 Series, No: 17730-190 Jan. 1995, Revision D.
ATRO Engineered Systems, EB50-21013 Bar Pin Bushing Kit, Jun. 16, 2010.
ATRO Installation Instructions for Hendrickson Bar Pin Bushing Kit ATRO p/n #EB50-21013, Nov. 2007.
ATRO Product Announcement SU50-29383 D-Pin Bushing, Feb. 2010.
ATRO Product Announcement UB20500-OS Spring Pivot Bushing, Oversized, Sep. 2008.
ATRO Technical Bulletin TBO92309 ATRO's UB20500 and New UB20500-OS in the Freightliner Air Liner II Suspension, Sep. 2009.
International Search Report and Written Opinion of PCT/US2010/034541 dated Dec. 6, 2010.
International Preliminary Report on Patentability for PCT/US2010/034541 mailed Jul. 2, 2012 (15 pages).

* cited by examiner

ROTATABLE BAR PIN BUSHING ASSEMBLY

BACKGROUND

The present application generally relates to innovations and improvements in the components used in vehicular systems, such as suspension and axle systems/subsystems. More particularly, the present application relates to a rotatable bar pin bushing assembly for vehicular systems (e.g., suspensions), such as for use in vocational or heavy haul truck applications.

Bar pin bushing assemblies for use in vehicular systems, such as suspensions, are known. Such assemblies are commonly used to connect different components of a vehicular system, such as beams, brackets, arms, clamps, frames, rails, rods, and other like components. In connecting these various components together, often times the holes or bores of one component, such as a bar pin bushing assembly, must be aligned or registered with the connector(s) (e.g., slots, adapters, holes/bores, etc.) of another component, such as a beam or a bracket. Indexing these components to align or register them can be difficult, especially if the components that need to be connected are already connected to other components in the system.

Existing bar pin bushing assemblies consist of a bar pin fixedly positioned and non-rotatable within one or more outer bushing components. As an example of such an existing assembly, a non-rotatable bar bin is fixedly positioned within a rubber sleeve that is in turn fixedly positioned within a metal sleeve. As yet another example, a non-rotatable bar pin is fixedly positioned directly within a metal sleeve by the use of a bonding agent, adhesive, resin, or epoxy. In both of these prior art designs, the bar pin is fixedly positioned and non-rotatable within the surrounding bushing components. As a result, when such a bar pin is non-rotatably fitted to one component (e.g., a walking beam), it is difficult, if not impossible, to index the non-rotatable bar pin to register/align the holes/bores of the bar pin with the connector(s) (e.g., slots, adapters, holes/bores, etc.) of another component (e.g., an axle bracket).

In view of the conditions identified above with respect to prior bar pin bushing assemblies for vehicular systems, such as suspensions and axle systems/subsystems, it is desired to provide a new and improved bar pin bushing assembly for such systems. In particular, it is desirable to have a bar pin bushing assembly that allows for the bar pin to be freely rotated and easily indexed (e.g., by hand) during installation so that the holes/bores of the bar pin may be registered/aligned to the connector(s) (e.g., slots, adapters, holes/bores, etc.) of another component in the system.

SUMMARY

Disclosed herein is a rotatable bar pin bushing assembly for connecting components in a vehicular system, such as a suspension or axle system/subsystem. The rotatable bar pin bushing assembly comprises an inner sleeve, an outer sleeve positioned around the inner sleeve, and an insert positioned between the inner and outer sleeves. The rotatable bar pin bushing assembly also comprises a bar pin rotatably positioned within the inner sleeve. The bar pin has at least one end with at least one bore extending therethrough to receive a fastener. The bar pin is rotatable within the inner sleeve to allow indexing of the bar pin for registering the at least one bore of the bar pin with a connector of a different component.

Also disclosed herein is a method for assembling the rotatable bar pin bushing assembly. The method comprising the steps of positioning an inner sleeve into an insert, disposing an outer sleeve around the insert and inner sleeve, and inserting a bar pin into and through the inner sleeve such that the bar pin is free to be rotated within the inner sleeve.

BRIEF DESCRIPTION OF THE DRAWINGS

Exemplary embodiments of the invention are described herein with reference to the drawings, wherein like parts are designated by like reference numerals, and wherein.

DETAILED DESCRIPTION

FIGS. 1A-4B illustrate an exemplary embodiment of a rotatable bar pin bushing assembly (generally designated "2") and its components. The rotatable bar pin bushing assembly 2 may be used to connect components in a variety of vehicular systems, such as vehicle suspension and axle systems/subsystems, as well as other applications requiring the use of bar pin bushing assemblies for connecting components. As one example, the rotatable bar pin bushing assembly 2 may be used to connect a walking beam to an axle bracket in a vehicular suspension/axle system. It should be understood that the term vehicle is used broadly herein to encompass all kinds of vehicles, including, but not limited to, all forms of cars, trucks, buses, recreational vehicles (RVs), motorcycles, etc. Moreover, for purposes of this description, unless specifically described otherwise, the term "vehicle" herein refers to a vehicle or a trailer. In this way, for example, a vehicle suspension system refers to a vehicle suspension or a trailer suspension.

The rotatable bar pin bushing assembly 2, in accordance with a given embodiment, may have and/or provide, but is not limited to having and/or providing, one or more of the following characteristics: (i) a bar pin that is at least initially rotatable within its surrounding bushing components; (ii) a bar pin that may be rotated or indexed to register/align the holes/bores of the bar pin to the connector(s) (e.g., slots, adapters, holes/bores, etc.) of a different and separate component; (iii) a rotatable bar pin that aids in the connection of the bar pin to another component; (iv) a bar pin that may be easily rotated by hand without the use of a tool; (v) a bar pin that, although initially rotatable for installation purposes, may become fixedly positioned within its surrounding bushing components due to oxidization, deformation, and/or expansion after being installed and used as a connector; and (vi) a bar pin bushing assembly that does not require bearings or maintenance, such as lubrication.

As shown in FIGS. 1A-1D, an exemplary embodiment of the rotatable bar pin bushing assembly 2 may include a bar pin 4, a bushing component assembly 20, first and second confinement washers 30, 31, and first and second retention rings 32, 33. The bar pin, the bushing component assembly, the confinement washers, and the retention rings are all concentric and share a common axis, as shown in FIGS. 1A-1D. It should be understood that the rotatable bar pin bushing assembly 2 may include more or less components, depending on user, design, system, and manufacturing preferences. For example, as discussed in more detail below, the rotatable bar pin bushing assembly 2 may have only one confinement washer and one retention ring, or alternatively, may have no confinement washers or retention rings.

Figure 2A:
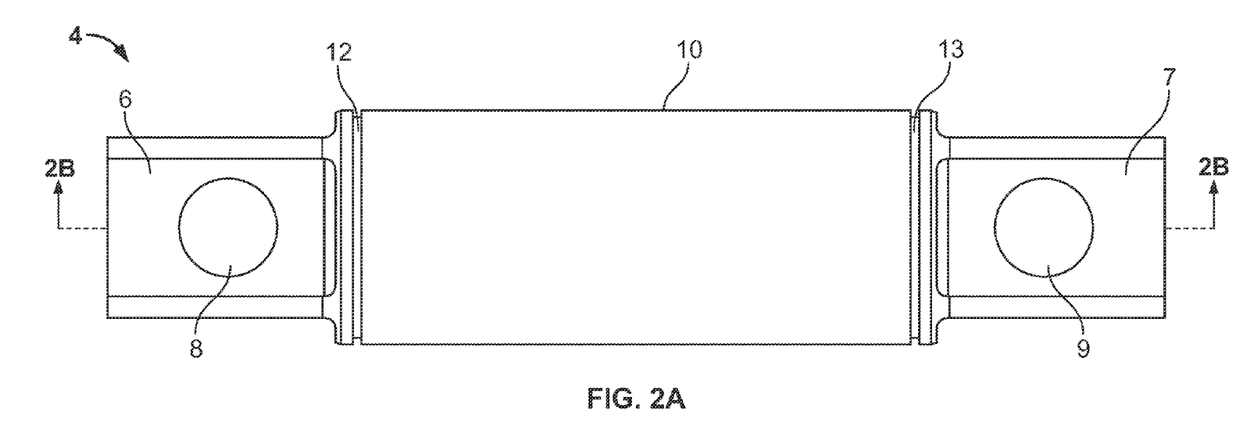
FIG. 2A is a side elevational view of the bar pin of the rotatable bar pin bushing assembly shown in FIGS. 1A-1D.
Figure 2B:
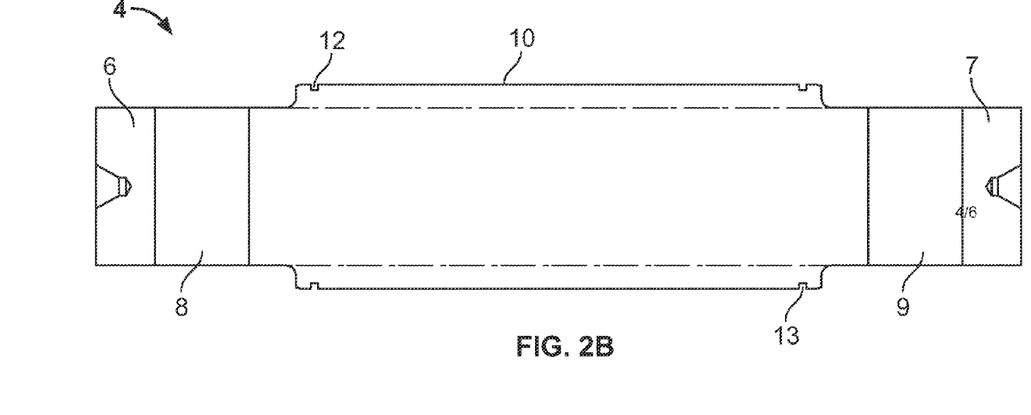
FIG. 2B is a sectional view of the bar pin illustrated in FIG. 2A, taken along lines 2B-2B thereof.
Figure 2C:
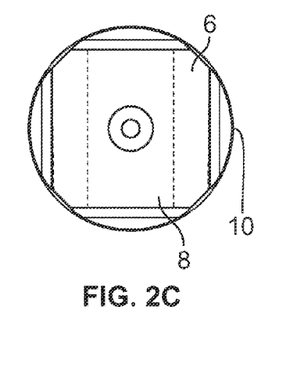
FIG. 2C is an end view of the bar pin shown in FIGS. 2A-2B, with the bore in a vertical position.

As shown in FIGS. 2A-2C, the bar pin 4 has a first end 6 and a second end 7 opposite the first end. The first and second ends 6, 7 of the bar pin 4 may each have one or more bores (or holes) for receiving a fastener (not shown), which could be used to connect the bar pin to a separate and different component (e.g., an axle bracket) of a vehicular system (e.g., a suspension/axle system). In the exemplary embodiment shown in FIGS. 2A-2B, the first end 6 has a first bore 8, and the second end 7 has a second bore 9. Both the first and second bores 8, 9 go all the way through the first and second ends 6, 7, respectively, to allow for fasteners (e.g., bolts) to pass through them. It should be understood that only one of the ends of the bar pin may have a bore, or alternatively, each end of the bar pin may have more than one bore. In addition, the bores in the first and second ends of the bar pin may be the same or different in size and/or shape, and may have any number of different configurations and dimensions. The size and shape chosen for the bores may depend on several factors, including, but not limited to, the size and shape of the fasteners used and/or the size and shape of the bores being registered with the bores in the ends of the bar pin. For example, the bores 8, 9 in the ends of the bar pin may be rectangular. In this way, the inserted fastener may comprise a round head and square neck bolt, known in the art as a carriage bolt. As another example, the bores 8, 9 in the ends of the bar pin may be circular. In this way, the inserted fastener may comprise a hex head bolt. Of course, it should be understood that other suitable fasteners, and correspondingly sized/shaped bores, may alternatively be used with the bar pin.

Each end 6, 7 of the bar pin 4 may also have any number of different sizes, shapes, and configurations depending on user, design, system, and manufacturing preferences. Each of the ends of the bar pin may have the same or a different size, shape, and/or configuration. As shown in the exemplary embodiment of FIGS. 2A-2C, each end of the bar pin has the same square shape with flattened corners. Alternatively, the ends of the bar pin may be entirely square without flattened corners, circular, or some other desirable shape. For example, the ends of the bar pin may be D-shaped, as described and shown in U.S. Pat. No. 7,182,354, which is specifically incorporated in its entirety herein by reference.

Other than any bores for fasteners, the ends of the bar pin may be solid, although it should be understood that some portion of the ends of the bar pin (in addition to the bores) may be hollow. Moreover, drop in shims (not shown) may be added to one or both of the ends 6, 7 of the bar pin 4 to increase the size and/or stability of the ends. The use of shims allows the ends of the bar pin to be made smaller or for the ends of the bar pin to fit larger bores on attached components.

As shown in FIGS. 2A-2B, the bar pin 4 also includes a center shaft 10 positioned between, and integral with, the first and second ends 6, 7 of the bar pin. In the exemplary embodiment shown and described herein, the center shaft 10 is cylindrical with a circular cross-section. The center shaft may be solid, hollow, or a combination of both, and the center shaft may have any desirable length depending on user, design, system, and manufacturing preferences. The center shaft 10 may also have a first groove 12 positioned near the first end 6 of the bar pin 4, and a second groove 13 positioned near the second end 7 of the bar pin 4, as shown in FIGS. 2A-2B. As explained in more detail below, the first and second grooves 12, 13 are designed and adapted to receive the first and second retention rings 32, 33, respectively. Each of these grooves may extend around the entire circumference of the center shaft, as shown in FIGS. 2A-2B, or only a portion of the center shaft, depending on the configuration of the retention rings. If other retention mechanisms are used instead of retention rings, the grooves may be modified and adapted to work with such replacement mechanisms. Of course, if retention rings or other retention mechanisms are not used with the rotatable bar pin bushing assembly, the grooves of the center shaft of the bar pin may be eliminated.

The bar pin 4 may be made of a variety of suitable materials, including, but not limited to, iron, steel, aluminum, brass, and bronze. Preferably, but not necessarily, the bar pin is made of steel. Alternatively, the bar pin 4 may be made of nodular iron.

The bushing component assembly 20, as shown in FIGS. 1A-1C and 4A-4B, of the rotatable bar pin bushing assembly 2 includes an inner sleeve 22 positioned around the bar pin 4, an insert 24 positioned around the inner sleeve 22, and an outer sleeve 26 positioned around the insert 24. The inner sleeve, insert, and outer sleeve are all concentric and share a common axis, as shown in FIGS. 1A-1D and 4A-4B. It should be understood, however, that more or less components may be used for the bushing component assembly 20. For example, two or more of the components may be combined into a single, integral component. Alternatively, more sleeves and/or inserts may be used with the bushing component assembly.

Figure 3A:
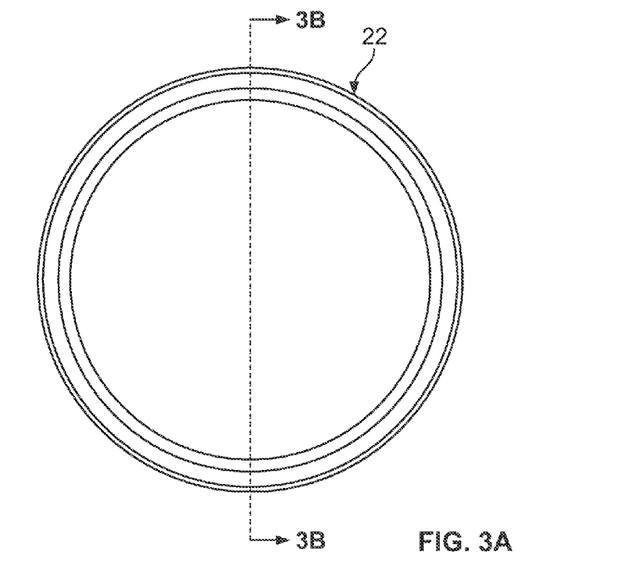
FIG. 3A is an end view of the inner sleeve of the rotatable bar pin bushing assembly shown in FIGS. 1A-1D.
Figure 3B:
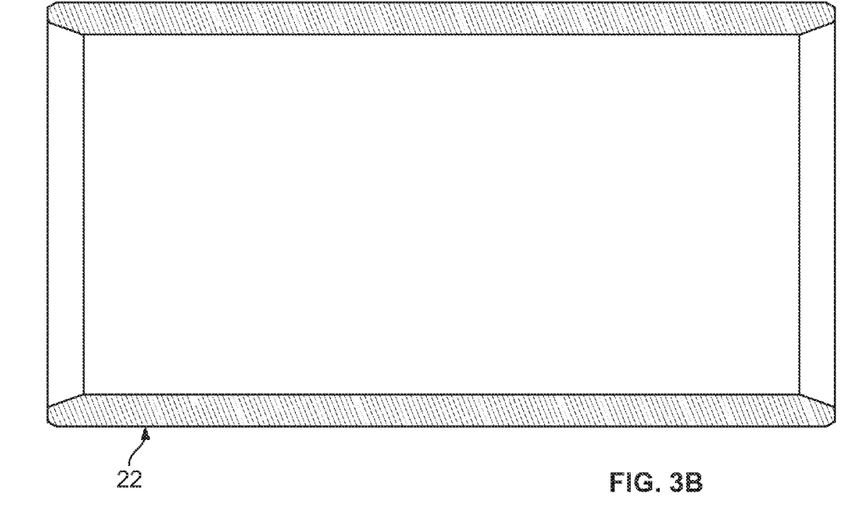
FIG. 3B is a sectional view of the bar pin illustrated in FIG. 3A, taken along lines 3B-3B thereof.

As shown in FIGS. 3A-3B, the inner sleeve 22 is a cylindrical tube with an inner diameter adapted to receive the bar pin 4. In the exemplary embodiment described and shown herein, the inner diameter of the inner sleeve 22 is designed to be slightly larger than, yet closely matched to (i.e., within tight tolerances of), the outer diameter of the center shaft 10 of the bar pin 4. Consequently, the center shaft, and thus the bar pin, are capable of rotating (preferably, freely rotating) within the inner sleeve. However, because the inner diameter of the inner sleeve and the outer diameter of the center shaft are closely matched in size to very tight tolerances, oxidization, deformation, and/or expansion after installation and during use of the rotatable bar pin bushing assembly 2 may cause the bar pin 4 to lock or seize up within the inner sleeve 22. Thus, the bar pin 4 may eventually be no longer rotatable with respect to the inner sleeve 22 (or the bushing component assembly 20).

Such a result—i.e., the bar pin being rotatable at the time of installation, but not rotatable after installation—is advantageous and desirable. For instance, the bar pin being rotatable at the time of installation helps the installer index, by hand, the bar pin and its bores to register/align them with the bores of a connecting component. On the other hand, the bar pin being non-rotatable after installation (and some use in the system) prevents unwanted wear from occurring because of constant or frequent rotational movement between the bar pin and the inner sleeve. With the bar pin and the inner sleeve becoming fixed and non-rotatable with respect to each other, thereby preventing rotational wear of the bar pin and/or the inner sleeve, there is also no need to provide bearings or lubrication between these components.

The length of the inner sleeve 22 may the same, shorter, or longer than the center shaft 10 of the bar pin 4. In the exemplary embodiment shown in FIGS. 1A-1B, the length of the inner sleeve 22 is matched to the length of the center shaft 10 of the bar pin 4, except that the inner sleeve is slightly shorter than the center shaft to allow for the use of the confinement washers 30, 31 and the retention rings 32, 33.

Figure 1A:
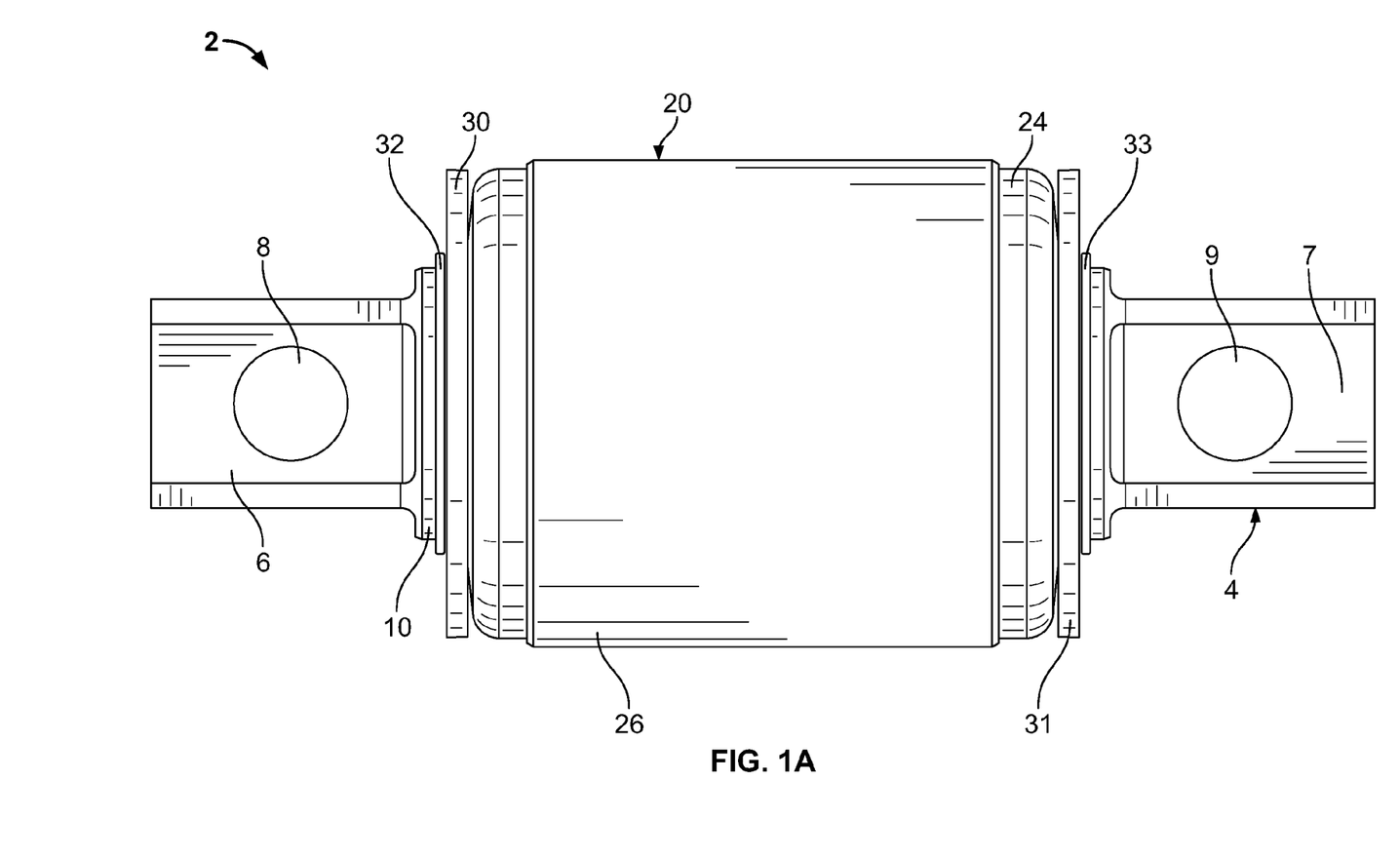
FIG. 1A is a side elevational view of an exemplary embodiment of a rotatable bar pin bushing assembly.
Figure 1B:
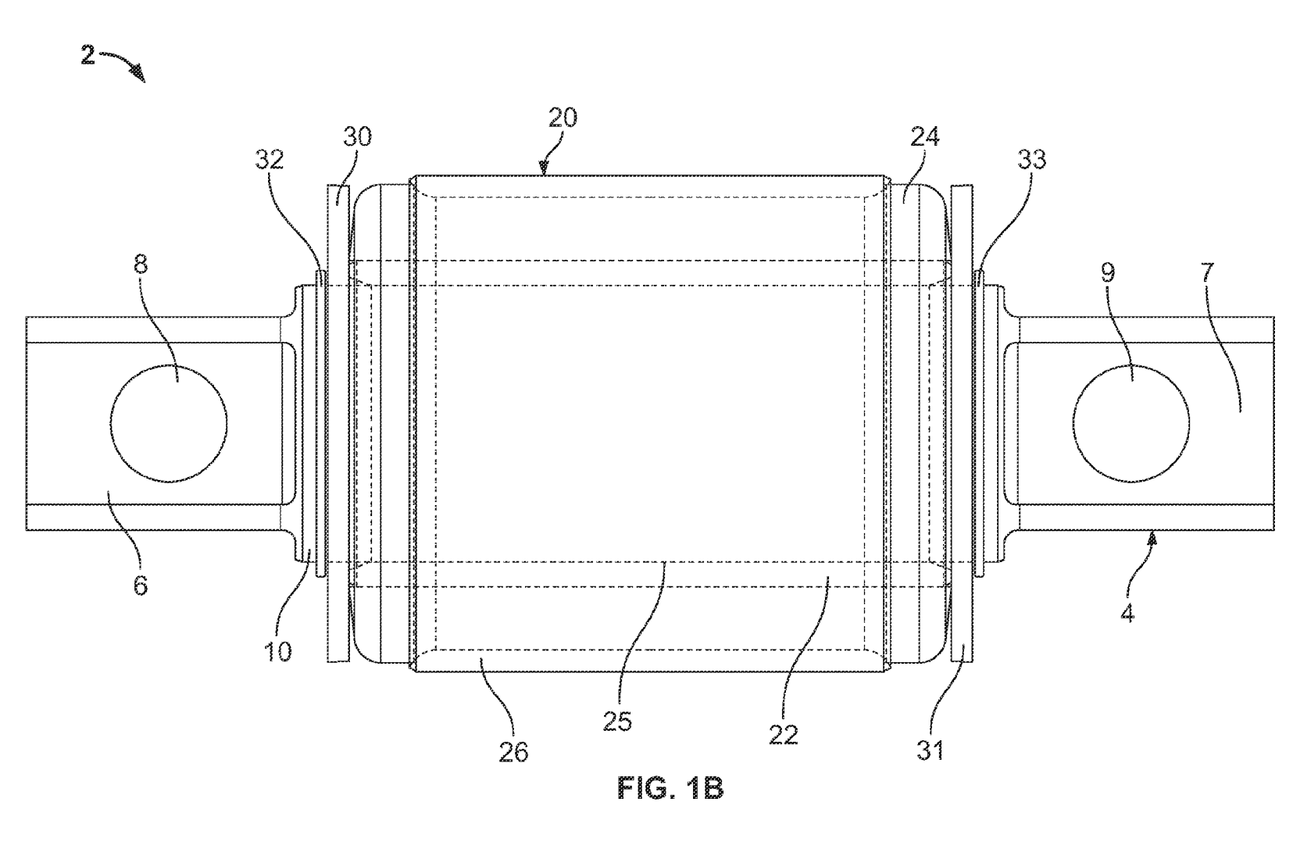
FIG. 1B is another side elevational view of the rotatable bar pin bushing assembly shown in FIG. 1A, with several internal structures illustrated by dashed lines.
Figure 1C:
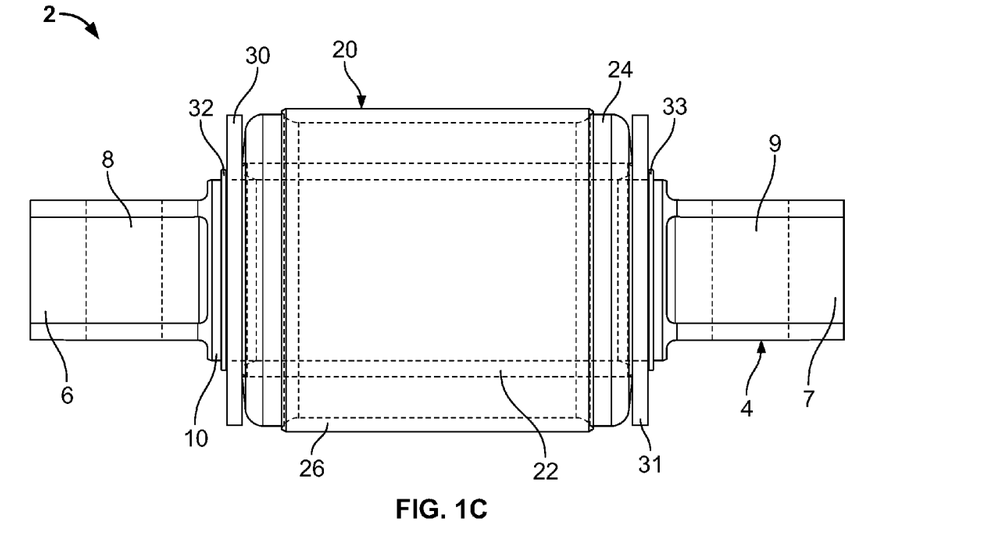
FIG. 1C is a top view of the rotatable bar pin bushing assembly shown in FIG. 1B.
Figure 1D:
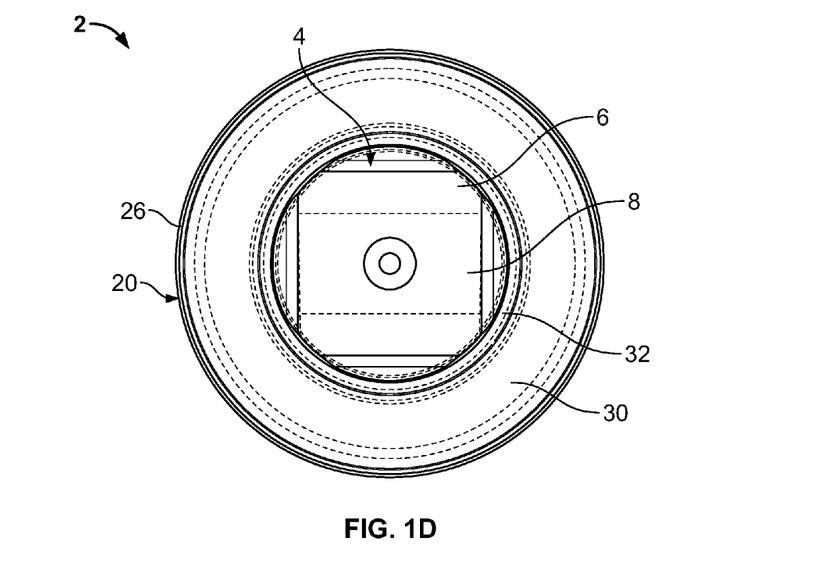
FIG. 1D is an end view of the rotatable bar pin bushing assembly shown in FIG. 1B.

The inner sleeve 22 may be made of a variety of suitable materials, including, but not limited to, iron, steel, aluminum, brass, and bronze. Preferably, but not necessarily, the inner sleeve is made of steel. Alternatively, the inner sleeve may be made of bronze. The material for the inner sleeve may be selected in conjunction with the material for the bar pin such that oxidation, deformation, and/or expansion along interface 25 between the inner sleeve 22 and bar pin 4 (as shown in FIG. 1B) is promoted after the rotatable bar pin bushing assembly has been installed and is in use in a vehicular system. For example, if steel is chosen for the bar pin, then it may be desirable to select steel for the inner sleeve.

Figure 4A:
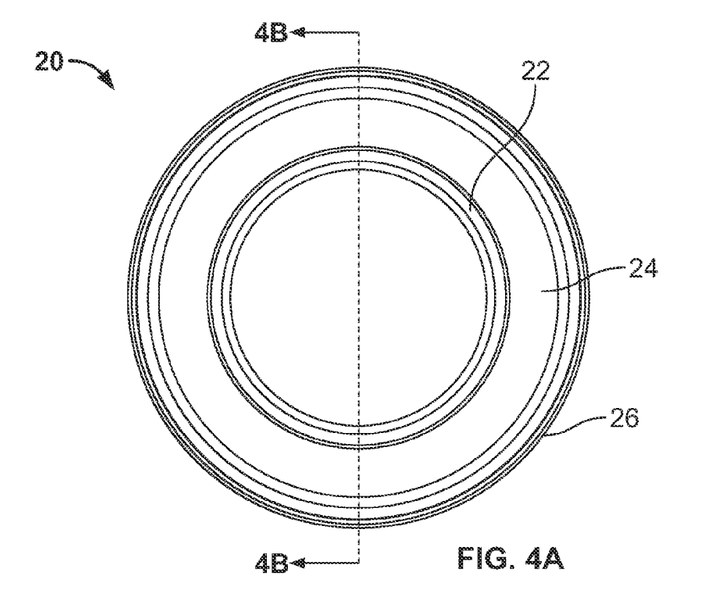
FIG. 4A is an end view of the bushing component assembly, including the inner sleeve, the insert, and the outer sleeve, of the rotatable bar pin bushing assembly shown in FIGS. 1A-1D.
Figure 4B:
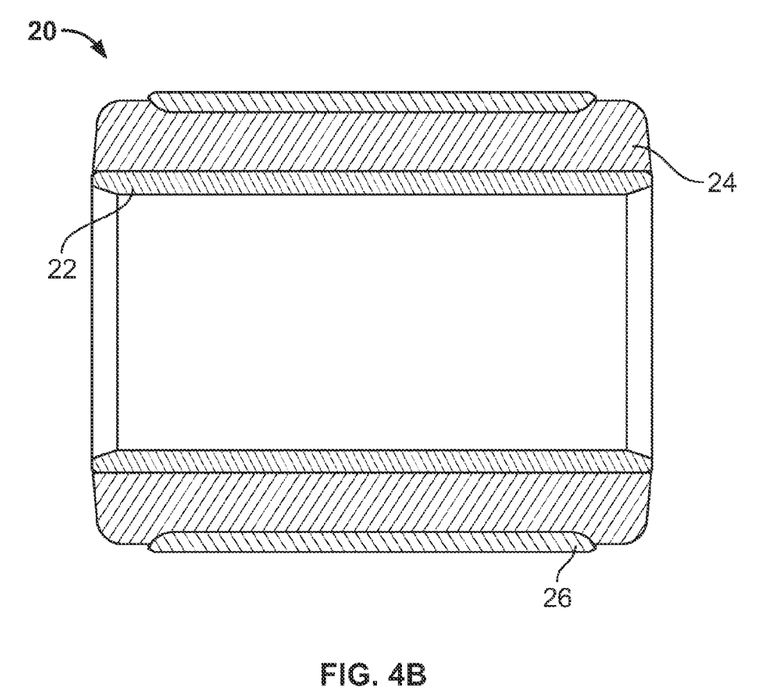
FIG. 4B is a sectional view of the bar pin illustrated in FIG. 4A, taken along lines 4B-4B thereof.

As shown in FIGS. 4A-4B, the insert 24 is a cylindrical tube positioned around the inner sleeve 22, and sandwiched between the inner sleeve 22 and the outer sleeve 26. In one exemplary embodiment, the insert 24 may be, but does not have to be, chemically bonded and fixed to one or both of the inner sleeve 22 and the outer sleeve 26 with a bonding agent (e.g., adhesive, resin, or epoxy). The bonding agent may be applied to the outer and/or inner surfaces of the insert, the outer surface of the inner sleeve, the inner surface of the outer sleeve, or a combination of these surfaces, and may occur prior to, during, and/or after assembly of the bushing component assembly. As an example, the bonding agent may comprise Chemlok® manufactured by the Lord Corporation, Cary, N.C., USA. Other examples of the bonding agent are also possible. In addition, the surfaces of the inner and outer sleeves adjacent to the insert may be coated with phosphate to assist in the bonding process. As a result of this bonding between these components, the inner sleeve, insert, and outer sleeve are fixed and non-rotatable with respect to each other.

The insert 24 may be the same length as the inner sleeve 22, as shown in FIG. 4B, but the insert could be shorter or longer depending on user, design, system, and manufacturing preferences. Moreover, the insert 24 is preferably, but not necessarily, made of an elastomeric material (i.e., an elastomer), such as natural rubber, synthetic rubber, styrene butadiene, synthetic polyisoprene, butyl rubber, nitrile rubber, ethylene propylene rubber, polyacrylic rubber, high-density polyethylene, thermoplastic elastomer, a thermoplastic olefin (TPO), urethane, polyurethane, a thermoplastic polyurethane (TPU), or some other type of elastomer.

As shown in FIGS. 4A-4B, the outer sleeve 26 is a cylindrical tube positioned around the insert 24. The outer sleeve is designed and adapted to be positioned and fitted in a bore or bushing of a separate and different component (e.g., walking beam) of a vehicular system (e.g., suspension/axle system). As mentioned above, the outer sleeve may be bonded to the insert with a bonding agent. In addition to this bonding, or as an alternative, the outer sleeve may be crimped, swaged, clamped, shrunk, pressured, or otherwise deformed onto/into the insert. In any event, the outer sleeve may be fixed in position around the insert.

In the exemplary embodiment shown in FIG. 4B, the outer sleeve 26 is shorter in length than the insert 24. As an alternative, the outer sleeve may be the same length as, or longer than, the insert 24. If longer, the ends of the outer sleeve 26 may be curled or rolled over the sides of the insert. With respect to its material, the outer sleeve 26 may be made of a variety of suitable materials, including, but not limited to, iron, steel, aluminum, brass, and bronze. Preferably, but not necessarily, the outer sleeve is made of steel. Alternatively, the outer sleeve may be made of bronze.

Returning to FIGS. 1A-1D, the first confinement washer 30 is positioned on the center shaft 10 of the bar pin 4 between the first groove 12 and the bushing component assembly 20, and the second confinement washer 31 is positioned on the center shaft 10 of the bar pin 4 between the second groove 13 and the bushing component assembly 20. Similarly, the first retention ring 32 is positioned in the first groove 12 on the center shaft 10 of the bar pin 4 adjacent to the first confinement washer 30, and the second retention ring 33 is positioned in the second groove 13 on the center shaft 10 of the bar pin 4 adjacent to the second confinement washer 31. According to this exemplary design, the confinement washers 30, 31 hold the insert 24 in place and constrain the insert from axial elongation due to radial and/or torsional loads on the rotatable bar pin bushing assembly during use. In turn, the retention rings 32, 33 hold (i.e., retain) the confinement washers in place with respect to the bar pin. Since the confinement washers of this exemplary design have a larger outer diameter than the inner sleeve, and the retention rings are locked in position within the grooves of the bar pin, the confinement washers and retention rings together prevent the bar pin from moving axially within the inner sleeve.

In one alternative embodiment, the confinement washers 30, 31 are not used to hold the insert in place or to keep the insert from axially elongating. In such an embodiment, the outer sleeve may be longer than the insert and the ends of the outer sleeve may be curled or rolled over the ends of the insert. For yet further alternative embodiments, those of ordinary skill in the art would appreciate other ways and mechanisms beside the confinement washers to constrain and hold the insert.

Other retention mechanisms may also be used instead of the retention rings 32, 33 to secure the confinement washers 30, 31. For example, clamps, pins, collars, keys, slots, snap locks, nuts, and other fasteners may be used. Such alternative retention mechanisms may be separate from the bar pin or formed integral with it. For example, in one alternative embodiment, an integral shoulder or flange may be formed in place of one of the grooves on the bar pin to retain the adjacent confinement washer.

It should be understood that, like the confinement washers, a retention mechanism (e.g., the retention rings) is not necessary to retain the confinement washers. For instance, the confinement washers may be swaged onto/into the inner sleeve or the bar pin, or alternatively, deformed in such a manner as to be fixedly attached to the bar pin without the use of a separate retention mechanism. Of course, it should also be understood that if the confinement washers are not used, the retention rings (or other retention mechanisms) may be unnecessary as well. In such a case, the grooves 12, 13 may be removed from the bar pin.

The above components of the rotatable bar pin bushing assembly 2 may be assembled as follows. As an initial step, the bushing component assembly 20 may be assembled. To assemble the bushing component assembly, the inner sleeve 22 may be disposed or positioned into the insert 24, and then the insert 24 may be disposed or positioned into the outer sleeve 26 (or the outer sleeve 26 may be disposed or positioned around the insert 24). As stated above, one or more of these components—the inner sleeve, the insert, and the outer sleeve—may be bonded and fixedly attached to each other.

Once the bushing component assembly has been formed, the next step is to insert the bar pin 4 through the inner sleeve 22, with the center shaft 10 of the bar pin being free to rotate within the inner sleeve. If necessary, the inner sleeve may be reamed to increase its inner diameter and allow a better fit/rotation of the bar pin. In one exemplary embodiment, the bar pin fits within the inner sleeve such that the bar pin is free to be rotated by hand without the use of a tool.

Next, the confinement washers 30, 31 are positioned on the center shaft of the bar pin, with each confinement washer abutting an opposite side of the insert (and possibly the inner sleeve). Once the confinement washers are in position, the retention rings 32, 33 may be locked into position in their respective grooves 12, 13 on the center shaft of the bar pin to hold the confinement washers in place. At that point, the bar pin bushing assembly 2 has been fully assembled and may be used to connect different components in a vehicular system, such as a suspension/axle system.

It should be understood, however, that other methods may be employed to assemble the rotatable bar pin bushing assembly 2, as recognized by those of ordinary skill in the art. As an example of such an alternative method, the bar pin 4 may be inserted into the inner sleeve 22 before the bushing component assembly 20 is assembled. Of course, if confinement washers or retention rings are not used in the rotatable bar pin bushing assembly, those steps may be eliminated from the assembly method and/or replaced with other steps (e.g., swaging different components together, curling or rolling the ends of the outer sleeve over against the sides of the insert, etc.).

The exemplary embodiment, as well as the alternative embodiments, described and shown herein provide for several new and useful advantages. First, the bar pin 4 is at least initially rotatable within the bushing component assembly 20, and therefore, may be rotated or indexed to register/align the holes/bores 8, 9 of the bar pin to the connector(s) (e.g., slots, adapters, holes/bores, etc.) of a different and separate component. Being able rotate/index the bar pin to register/align the holes/bores in this fashion makes it easier to connect two different components together with the bar pin bushing assembly, especially when the different components are already in place and attached to other components. Without being able to rotate the bar pin, registering and aligning the holes/bores of the bar pin with the connector(s) (e.g., slots, adapters, holes/bores, etc.) of another component would be difficult, if not impossible—especially if the components are already connected to other components in the vehicular system. In fact, in the case of a non-rotatable bar pin, the component may have to be removed from one or more other components in the system before attaching it to the bar pin. In other cases, the component's bushing may have to be discarded and replaced with another one that is better registered/aligned with the non-rotatable bar pin. With the rotatable bar pin bushing assembly described and shown herein, however, these drawbacks are eliminated.

As mentioned above, other advantages of the rotatable bar pin bushing assembly described and shown herein include a bar pin that, although initially rotatable for installation and assembly purposes, may become fixedly positioned and non-rotatable within the surrounding bushing component assembly after installation (and some use in the system) due to oxidization, deformation, and/or expansion. As a result of the bar pin becoming non-rotatable after installation/use, undesirable rotational wear between the bar pin and the inner sleeve is prevented, and bearings or lubrication between these components to prevent such rotational wear is unnecessary.

While this invention has been described with reference to certain illustrative aspects, it will be understood that this description shall not be construed in a limiting sense. Rather, various changes and modifications can be made to the illustrative embodiments without departing from the true spirit and scope of the invention, as defined by the following claims. Furthermore, it will be appreciated that any such changes and modifications will be recognized by those skilled in the art as an equivalent to one or more elements of the following claims, and shall be covered by such claims to the fullest extent permitted by law.

Finally, the word "exemplary" is used herein to mean "serving as an example, instance, or illustration." Any embodiment described herein as "exemplary" is not necessarily to be construed as preferred or advantageous over other embodiments.

We claim:

1. A rotatable bar pin bushing assembly for connecting components in a vehicular system, the assembly comprising:
   a cylindrical inner sleeve having an inner surface comprised of a first metal;
   an outer sleeve positioned around the inner sleeve;
   an insert positioned between the inner and outer sleeves;
   a bar pin having a cylindrical outer surface comprised of a second metal rotatably positioned within the inner sleeve, the bar pin having a first end and a second end opposite the first end, the first end or the second end having a bore extending therethrough to receive a fastener;
   wherein the bar pin is rotatable within the inner sleeve to allow indexing of the bar pin for aligning the bore of the bar pin with a connector of a different component;
   a first confinement washer positioned on a center shaft of the bar pin near the first end of the bar pin and against the insert to hold the insert in place; and
   a first retention ring positioned within a first groove on the center shaft of the bar pin, the first retention ring holding the first confinement washer in place against the insert.

2. The rotatable bar pin bushing assembly of claim 1 wherein the inner sleeve, the outer sleeve, and the bar pin are all made of metal, and the insert is made of rubber.

3. The rotatable bar pin bushing assembly of claim 1 wherein the inner sleeve, outer sleeve, and insert are fixedly positioned and non-rotatable with respect to each other.

4. The rotatable bar pin bushing assembly of claim 1 wherein the inner sleeve has an inner diameter that is closely matched to an outer diameter of the center shaft of the bar pin, and the bar pin is restricted from rotation within the inner sleeve after the rotatable bar pin bushing assembly has been installed and used in a vehicular system because of at least one of oxidization, deformation, and expansion at the interface between the inner surface of the inner sleeve and the outer surface of the bar pin.

5. The rotatable bar pin bushing assembly of claim 4, wherein the first metal and the second metal are comprised of one of iron, steel, aluminum, brass, and bronze.

6. The rotatable bar pin bushing assembly of claim 5, wherein the first metal and the second metal are both comprised of steel.

7. The rotatable bar pin bushing assembly of claim 1, wherein the first metal and the second metal are comprised of one of iron, steel, aluminum, brass, and bronze.

8. The rotatable bar pin bushing assembly of claim 1, wherein the first metal and the second metal are both comprised of steel.

9. A rotatable bar pin bushing assembly for connecting components in a vehicular system, the assembly comprising:
a cylindrical inner sleeve having an inner surface comprised of a first metal;
an outer sleeve positioned around the inner sleeve;
an insert positioned between the inner and outer sleeves; and
a bar pin having a cylindrical outer surface comprised of a second metal rotatably positioned within the inner sleeve, the bar pin having a first end and a second end opposite the first end, the first end or the second end having a bore extending therethrough to receive a fastener;
wherein the bar pin is rotatable within the inner sleeve to allow indexing of the bar pin for aligning the bore of the bar pin with a connector of a different component;
a first confinement washer positioned on a center shaft near the first end of the bar pin and against the insert to hold the insert in place;
a second confinement washer positioned on a center shaft near the second end of the bar pin and against the insert to hold the insert in place; and
a first retention ring positioned within a first groove on the center shaft of the bar pin, the first retention ring holding the first confinement washer in place against the insert, and a second retention ring positioned within a second groove on the center shaft of the bar pin, the second retention ring holding the second confinement washer in place against the insert.

10. The rotatable bar pin bushing assembly of claim 9, wherein the first metal and the second metal are comprised of one of iron, steel, aluminum, brass, and bronze.

11. A rotatable bar pin bushing assembly for connecting components in a vehicular system, the assembly comprising:
a cylindrical inner sleeve having an inner surface comprised of a first metal
an outer sleeve positioned around the inner sleeve;
an insert positioned between the inner and outer sleeves; and
a bar pin having a cylindrical outer surface comprised of a second metal rotatably disposed in the inner sleeve, the bar pin having a first end and a second end opposite the first end, each of the first and second ends extending beyond the inner sleeve, each of the first and second ends of the bar pin having a bore to receive a fastener, each bore extending through its respective end of the bar pin, the bar pin also having a center shaft between the first and second ends, the center shaft being rotatably positioned within the inner sleeve;
wherein the bar pin is freely rotatable within the inner sleeve to allow indexing of the bar pin for aligning at least one of the bores of the bar pin with a connector of a different component;
a first confinement washer positioned on the center shaft near the first end of the bar pin and against the insert to hold the insert in place, and a second confinement washer positioned on the center shaft near the second end of the bar pin and against the insert to hold the insert in place; and
a first retention ring positioned within a first groove on the center shaft of the bar pin, the first retention ring holding the first confinement washer in place against the insert, a second retention ring positioned within a second groove on the center shaft of the bar pin, the second retention ring holding the second confinement washer in place against the insert, and wherein the confinement washers and retention rings restrict the bar pin from moving axially within the inner sleeve.

12. The rotatable bar pin bushing assembly of claim 11 wherein the inner sleeve, the outer sleeve, and the bar pin are all made of metal, and the insert is made of rubber.

13. The rotatable bar pin bushing assembly of claim 11 wherein the outer sleeve is adapted to be inserted into a bushing in a walking beam, and at least one of the bores of the bar pin is adapted to be registered with and fastened to a connector of an axle bracket.

14. The rotatable bar pin bushing assembly of claim 11, wherein the first metal and the second metal are comprised of one of iron, steel, aluminum, brass, and bronze.

* * * * *